United States Patent [19]

Stoll

[11] Patent Number: 5,107,897
[45] Date of Patent: Apr. 28, 1992

[54] MOUNTING PLATE

[75] Inventor: Kurt Stoll, Esslingen, Fed. Rep. of Germany

[73] Assignee: Festo KG, Esslingen, Fed. Rep. of Germany

[21] Appl. No.: 674,525

[22] Filed: Mar. 22, 1991

[30] Foreign Application Priority Data

Apr. 4, 1990 [DE] Fed. Rep. of Germany ....... 4010840

[51] Int. Cl.$^5$ .............................................. F16K 11/00
[52] U.S. Cl. ...................................... 137/884; 137/271
[58] Field of Search ......................... 137/271, 560, 884

[56] References Cited

U.S. PATENT DOCUMENTS

| | | | |
|---|---|---|---|
| 3,234,963 | 2/1966 | Lyon | 137/608 |
| 3,550,621 | 12/1970 | Lansky | 137/608 |
| 3,646,963 | 3/1972 | Klee | 137/608 |
| 3,654,960 | 4/1972 | Kiernan | 137/608 |
| 3,698,432 | 10/1972 | Kutz | 137/608 |
| 3,707,989 | 1/1973 | Jullien-Davin | 137/608 |
| 3,805,847 | 4/1974 | Manning | 138/115 |
| 3,875,959 | 4/1975 | Bouteille | 137/119 |
| 3,934,605 | 1/1976 | Legris | 137/271 |
| 4,130,137 | 12/1978 | Lane | 137/884 |
| 4,230,143 | 10/1980 | Dettmann et al. | 137/270 |
| 4,301,832 | 11/1981 | Smith | 137/512 |
| 4,305,430 | 12/1981 | Svensson | 138/115 |
| 4,348,942 | 9/1982 | Stoll | 91/54 |
| 4,378,027 | 3/1983 | Weirich et al. | 137/596.16 |
| 4,415,004 | 11/1983 | Bouteille | 137/884 |
| 4,483,365 | 11/1984 | Fallon | 137/343 |
| 4,498,693 | 2/1985 | Schindele | 285/137 R |
| 4,512,362 | 4/1985 | Groeschner | 137/356 |
| 4,524,807 | 6/1985 | Toliusis | 137/884 |
| 4,527,589 | 7/1985 | Stoll | 137/596 |
| 4,815,496 | 3/1989 | Nishitani et al. | 137/884 |
| 4,896,700 | 1/1990 | Stoll | 137/884 |

FOREIGN PATENT DOCUMENTS

| | | |
|---|---|---|
| 1923833 | 11/1970 | Fed. Rep. of Germany . |
| 2232387 | 1/1974 | Fed. Rep. of Germany . |
| 2943504 | 5/1981 | Fed. Rep. of Germany . |
| 3246970 | 6/1984 | Fed. Rep. of Germany . |
| 3309786 | 7/1984 | Fed. Rep. of Germany . |
| 8423236.6 | 1/1985 | Fed. Rep. of Germany . |
| 3507167 | 9/1986 | Fed. Rep. of Germany . |
| 3609605 | 9/1987 | Fed. Rep. of Germany . |
| 3733708 | 9/1988 | Fed. Rep. of Germany . |
| 3827749 | 9/1990 | Fed. Rep. of Germany . |
| 2439354 | 5/1960 | France . |
| 2530520 | 1/1984 | France . |

Primary Examiner—John C. Fox
Attorney, Agent, or Firm—Flynn, Thiel, Boutell & Tanis

[57] ABSTRACT

A mounting plate for component such as valves or other members and device. In its two surfaces there is respectively a series or row of mounting recesses arranged so that the recesses of the one series are offset to those in the other series and between respectively two mounting recesses there is a supply duct. Via the supply duct it is possible for a medium such as energy or the like to be supplied. By the intermediary of the mounting recesses it is possible for component to be secured in place. By tapping the supply duct the medium necessary for the operation of the component may be supplied.

14 Claims, 2 Drawing Sheets

MOUNTING PLATE

BACKGROUND OF THE INVENTION

The invention relates to a mounting plate for components such as valves or other devices and instrumentalities, having spaced adjacent slot-like recesses formed in the surface of the plate which are parallel to each other and adapted to serve for attachment, and furthermore a plurality of supply ducts for a medium such as a fluid or energy, said ducts extending parallel to the attachment recesses in the plate.

Such a mounting plate is described in the German patent publication 3,827,749 A. It makes possible the clamping or attachment of components such as valves or other instrumentalities and devices such as piston and cylinder units or the like through the intermediary of the mounting recesses. Anchoring members for example may be arranged in the latter, such anchoring members being for instance in the form of clamping devices or the like. The supply ducts enable any desired medium to be provided for the components and such medium may for instance be in the form of compressed air or energy in some other form. Then the supply ducts may be tapped for the components or the like mounted on the mounting plate in order to provide them with the medium needed for instance for their operation.

Despite these advantages the prior art mounting plate is comparatively awkward owing to its comparatively large weight. Furthermore, in the case of some applications there is relatively little space available for the mounting of the components.

SHORT SUMMARY OF THE PRESENT INVENTION.

Accordingly one object of the invention is to so improve a mounting plate of the type initially mentioned that it makes simpler handling possible.

A further aim of the invention to provide such a plate with compact dimensions.

Yet a further object of the invention is to provide such a plate which is of even more general application.

In order to achieve these and/or other aims in a second plate surface opposite to a first plate surface further mounting recesses are present, which are also arranged parallel to and spaced from each other in a series with the same direction as the mounting recesses, extending parallel thereto, in the first surface of the mounting plate in such a manner that as seen in plan and looking towards one of the two surfaces—with the exception of the ends of he series—one respective mounting recess in the one series is arranged between two mounting recesses of the series and in the part between two adjacent mounting recesses of a given series a supply duct is provided, which is opposite to a mounting recess of the other series transversely in relation to the direction of the series.

It is in this manner that the invention provides a mounting plate, which renders it possible to mount components, members or the like selectively on one or both of the two plate surfaces. The space available for mounting is accordingly practically doubled. Furthermore there is the possibility of securing the mounting plate to a support by means of the mounting slots in its one surface. Furthermore, for each mounting recess it is possible to provide an individual supply duct so that independent supply with the medium is ensured. Furthermore despite the possibility of universal application there is still a compact manner of construction of the mounting plate and its vertical dimension is small. In addition to these features there is a substantial reduction in weight, something that facilitates handling. There is practically no limit to the different widths, as measured in the direction of the recesses in a series, which may be produced and preferably the plate may be produced by extrusion. If it is necessary a plurality of plates may be arranged with their longitudinal edges in contact in order to increase the area of the plate which may be utilized.

Advantageous further embodiments of the invention are defined in the claims.

It is convenient if channel-like cavities are provided in the part between adjacent mounting recesses of the two series and/or between supply ducts which are adjacent to each other and are associated with the two series, such cavities extending through the mounting plate and more particularly leading to a reduction in weight of the mounting plate.

In the case of preferred embodiments of the invention the design is such that at least one of the supply ducts communicates or is able to communicate, with at least one medium outlet opening, which is provided or is to be provided in the mounting plate and preferably extending in the direction of the plane of the plate and able to be shut off, such opening being preferably provided on the surface of the plate nearest to the supply duct between two mounting recesses. In this case it is also possible for the design to be such that the medium connection opening is in the directly adjacent mounting recess associated with the other plate surface. The connection openings render possible a tapping of the supply duct in order to make the medium therein available at the desired point on the surface of the plate for instance for the operation of a device mounted here which may be in the form of a piston and cylinder unit.

It is an advantage if in at least one of the mounting recesses present at least anchoring member is able to be detachably inserted, which produces a firm or permanent connection between the mounting plate and the component or the like to be mounted. In the mounted condition it may for instance make essentially planar contact with the associated surface of the plate and adjacent to the limit surface it may be provided with attachment members such as magnetic devices, burr fasteners, adhesive connecting devices or the like.

The invention will now be described in more detail with reference to the accompanying drawings, which show several working embodiments thereof.

LIST OF THE SEVERAL VIEWS OF THE FIGURES.

Figure 1:
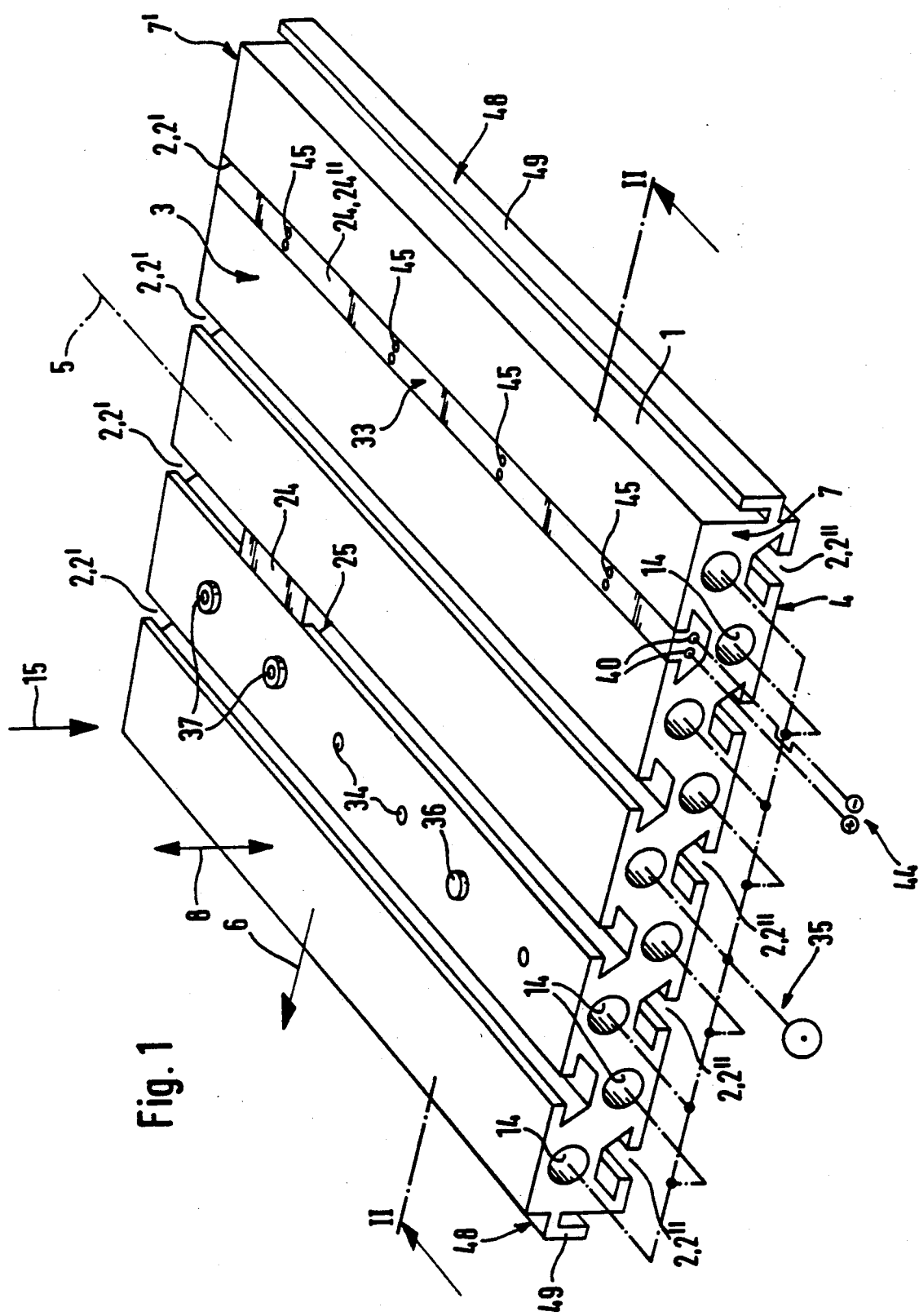
FIG. 1 shows a first possible working embodiment of the mounting plate in accordance with the invention in perspective.

Figure shows part of the mounting plate on a larger scale in accordance with FIG. 1 in cross section in order to make clear the mounting of a component thereon and one possible way of supplying it with medium as needed for the operation thereof.

DETAILED ACCOUNT OF WORKING EMBODIMENTS OF THE INVENTION.

The mounting plates 1 illustrated in the figures have, as seen in cross section, an essentially rectangular outline which is only interrupted by a plurality of mounting recesses 2. Such mounting recesses 2 are provided in both of the major surfaces 3 and 4 of the plate which surfaces are otherwise generally planar. The planes defined by the two plate surfaces 3 and 4 run parallel to each other.

The mounting recesses 2 and 2' let into the first plate surface 3 all have a linear configuration and are arranged in a series alongside each other with an intermediate spacing in a row extending transversely to the longitudinal direction 5 of the plate. The direction 6 of the series or row accordingly extends in the breadth direction of the mounting plate.

The mounting recesses 2 and 2" in the opposite, second plate surface 4, which in the illustrated working embodiment is turned downwards for use, are in a corresponding manner also arranged parallel to each other with a clearance between them in a series or row, the direction 6 of the same coinciding with the direction of the first-noted row or series of mounting recesses. With this design the mounting recesses 2 of the plate surface 3 and 4 on the two sides are mutually parallel.

The mounting recesses 2 are in the form of slots or grooves and preferably extend along the mounting plate 1 in the longitudinal direction from end to end so that they open at the two opposite end edges 7 and 7' of the plate. Furthermore the arrangement is preferably such that all mounting recesses 2 present have the same configuration and outline when viewed in cross section.

The height of the mounting plate 1 is defined by the distance between the two plate surfaces 3 and 4. Furthermore preferably the depth as indicated by the arrow 8 of the individual mounting recesses is also constant as measured from the respectively associated plate surface 3 and 4, towards which they open. The result is then an arrangement which is more particularly illustrated in FIG. 2, in accordance with which the mounting recesses 2 of the respective series of recesses extend in a common plane 9 and 10, such two planes 9 and 10 with the recesses being spaced from each other in the vertical direction 8.

In addition to the mounting recesses 2 the mounting plate 1 has a plurality of supply ducts 14 in its interior. Unlike the recesses they are not open towards one of the surfaces of the plate and instead are closed on all sides thereof. However they preferably open, like the mounting recesses 2, at the two end edges 7 and 7' of the plate and extend parallel to the mounting recesses. The configuration of the cross section of the supply ducts 14 is preferably identical and preferably it is rounded. In the working embodiments the supply ducts 14 have a uniform, circular configuration.

Since both the ducts and also the recesses are continuous and not interrupted, it is possible for the mounting plate to be produced using a suitably configured tool in an extrusion operation.

The supply ducts 14 are suitable for conducting a large number of different types of medium or fluid, which is required at any desired point on the surface 3 or 4 of the plate.

The medium may for instance be a hydraulic medium such as oil or may be compressed air. The supply ducts 14 may also be employed for vacuum. In addition to this it is possible for the ducts to be utilized for energy as for instance in the form of electrical or optical energy, more particularly using suitably adapted energy conductors such as cables, optic guides or the like, which may be laid in the supply ducts 14.

In order to make the plate structure particularly light in weight and compact the arrangement is such that as seen in the direction as indicated by the arrow 15 looking towards one of the two surfaces 3 and 4 of the plate one respective mounting recess of the one series in the one plate surface is between two adjacent mounting recesses in the other respective opposite series. The mounting recesses of the two plate surface 3 and 4 are thus so arranged that the recesses of the one series are preferably centrally opposite the gaps between the recesses in the other series. The supply ducts 14 are so arranged in the interior of the plate that between two directly in adjacent mounting recesses of one respective plate surface 3 and 4 one supply duct 14 is positioned. A respective supply duct positioned between two mounting recesses of the one series of recesses is also in addition opposite to a mounting recess 2 in the other series of recesses in the vertical direction as indicated by the double arrow 8.

Figure 2:
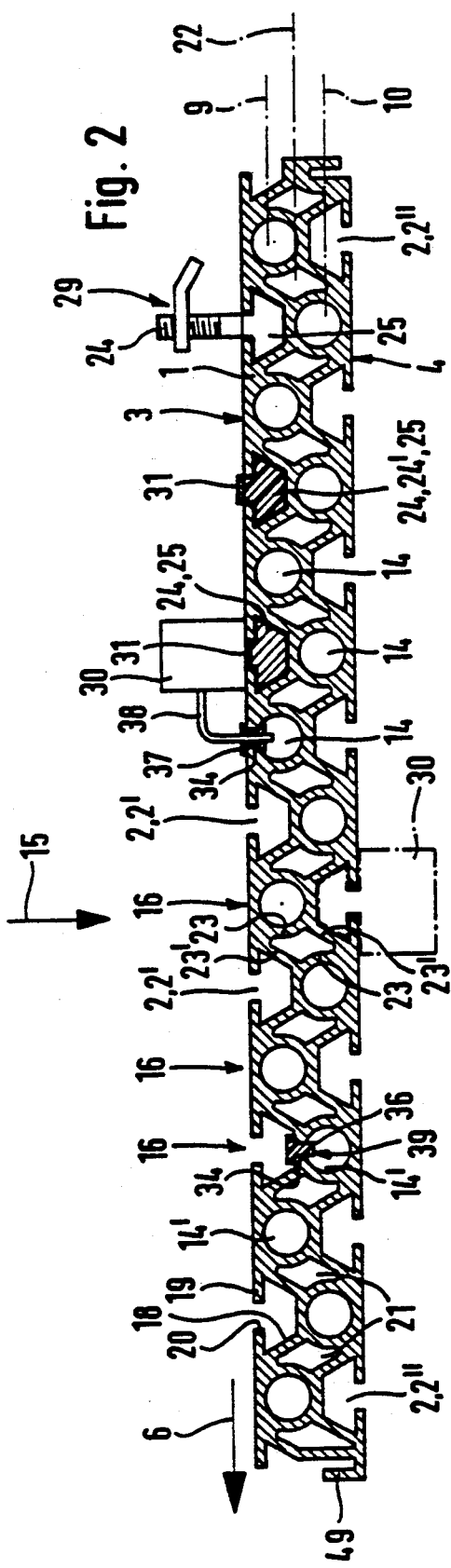
FIG. 2 shows a further working embodiment of a mounting plate in cross section on the section line II—II of FIG. 1.

The result is therefore a configuration which may be more particularly seen from FIG. 2. A plurality of pairs 16, consisting each of two supply ducts 14 (which are superposed in the vertical direction 8) and mounting recesses 2, is arranged in sequence in the breadth direction, which coincides with the direction of the row or series as indicated by the arrow 6, the ducts 14 and the recesses 2 of respectively directly following pairs 16 of ducts and recesses being associated with opposite plate surfaces 3 and 4.

In the illustrated working embodiments the supply ducts 14 associated with one respective series of recesses extend substantially in the same plane 9 and 10 as the mounting recesses 2 of the corresponding series so that in each plane 9 and 10 supply ducts 14 and supply recesses 2 are arranged alternately in the breadth direction of the mounting plate.

The mounting recesses present may be in the form of T-slots or dovetail slots or the like. In any event starting at the respective plate surface 3 or 4, towards which they are open along their length, they extend into a locking, deeper part 18 in the interior adjacent to a shoulder 19 adjoining a neck 20 extending towards the outer surface of the plate and having a reduced breadth. When the mounting recesses are T-slots the locking part 18 has a rectangular outline when seen in cross section. In the illustrated working embodiment, which is preferred, the mounting recesses 2 are trapezoidal in their locking parts 18, the parallel base lines of the trapezium extending parallel to the surfaces 3 and 4 of the plate and the narrower neck, which produces a connection with the surface of the plate, adjoins at the side with the larger trapezium base or side.

More particularly in order to economize in material and to reduce weight it is possible to have a configuration such that in the respective part between two supply ducts 14 and 14' following each other in the breadth direction 6 and associated with the different planes of the recesses, a duct-like cavity 21 is arranged. This cavity illustrated in FIG. 2. The cavities as well extend from end to end in the longitudinal direction and thus have a linear form. All the duct-like cavities 21 are arranged in the illustrated working embodiment of FIG. 2 so that they extend in a middle plane 22, which runs between the two recess planes 9 and 10 and parallel thereto.

It is an advantage as regards strength and for economizing in material if the form of the walls of the cavities 21 in the part adjacent to a supply duct 14 and/or a mounting recess 2 is configured essentially in accordance with the outline of the adjacent duct wall or, respectively, recess wall part. It is in this manner that it is possible to have a curved outline bulging into the interior of the cavity, in the cavity wall parts associated with the supply ducts 14, the centers of curvature being the center of the respectively associated supply duct 14. The two intermediately arranged cavity wall parts 23', which are adjacent to one mounting recess 2, are however essentially flat in order to be adapted to the oblique side of the trapezoidal mounting recesses. All in all there is therefore a sort of diamond or rhombic form of the cross section of the cavity, two respectively opposite sides of a diamond being curved inwards.

It is in this manner that the form of the cross section of the mounting plate 1 consists of a plurality of straight and/or curved rib-like, connected wall sections so that despite the economy in the use of material a high degree of strength is ensured.

Anchoring parts 24 with a locking part 25 may be detachably inserted into the mounting recesses 2. The outline of the locking part 25 is preferably complementary to the outline of the associated mounting recess. Using the anchoring parts it is possible for any desired components, members and/or devices to be secured in place in the mounting plate 1. Furthermore the mounting plate 1 may be held by it in relation to another holder.

For instance FIG. 2 shows an anchoring part 24 in the form of a sprag 29, whose threaded part, adjacent to the locking part, projects out of the mounting recess, which receives the locking part 25, past the surface 3 of the plate 2. It is in this manner that a workpiece, for instance, may be anchored using a screw connection means. The anchoring part 24 may however also belong to another securing device, which makes it possible to hold workpieces or other members. The manner of operation may be mechanical, the operating medium being supplied via the supply ducts in the manner explained.

In the case of the working embodiment illustrated in FIG. 3a locking part 25 is constituted by a suitably designed foot of a component 30.

It will generally be seen that anchoring parts with any desired attachment means may be utilized for components, members or devices, if there is only one holding part, which makes possible mounting in the recesses 2. In the illustrated working embodiment the locking part 25 hooks behind the shoulder 19, as already mentioned, of the associated mounting recess so that there is not possibility of removal in the vertical direction 8 of the mounting plate 1. Assembly is preferably by pushing in from one of the two end edges 7 and 7' of the plate.

In lieu of a mounting means, which in the mounted condition projects past the surface of the plate, as is the case with the threaded part of the sprag 29, it is possible as well for the mounting means to end substantially flush with the part of the surface 3 and 4 of the plate adjacent to the mounting recess. As shown in FIG. 2 there are two corresponding designs. In both cases the anchoring part 24 and 24' consists essentially of only the locking part 25, which essentially runs flush to the surface 3 of the plate and at this position bears a thin strip 31 as a tethering means. The strip may for instance be a magnetic strip of a burr fastener strip as a part of a burr fastening device. In the case of the working embodiment as shown in FIG. 2 on the left an adhesive strip 31 is provided, on which a component 30 detachably adheres.

The strips 31 preferably extend in the longitudinal direction of the associated recess, and for each anchoring part 24 it is certainly possible to have a plurality of strip sections, which are arranged with a clearance between them.

Dependent on the actual need it is possible for one respective anchoring part 24 and/or its locking part 25 to have a length approximately equal to the length of a mounting recess 2 present or to be shorter than the same. The two possibilities are illustrated in FIG. 1. Since the anchoring parts are preferably held slidingly and with their locking parts in the mounting recesses, there is the possibility of slight positioning adjustment more particularly in the case of the short version. It will be clear that in addition to the parts illustrated in figure it is possible to have further means, not illustrated, for securing the anchoring parts at the desired position.

Furthermore it is possible to use one anchoring part 24 and 24" simply as a filler part as is illustrated in the part of FIG. 1 showing the longer version of the anchoring part. In this case the intention is only to have a more particularly continuous bridging over of the slot, which is produced by the associated mounting recess in the surface of the plate 3, and the limit surface 33, which is flush with the surface 3 of the plate, generally constitutes a part of the plate surface available as a support surface.

In order to supply components or the like secured to either of the two plate surfaces at any point thereon with medium necessary for their operation, such as compressed air or electrical energy, the mounting plate 1 has at least one and preferably a plurality of connection openings 34, via which at least one supply duct 14 is able to be tapped. The design is in principle such that the supply ducts 14 are supplied with suitable medium via a supply means 35 illustrated in broken lines, such medium being more particularly supplied and removed via the duct openings at the one of the end edges 7 and 7' of the plate. In the event of the medium being constituted by a fluid the supply duct will in effect be flow ducts. However the supply ducts may also have electrical or optical cables and conductors laid in them. It is an advantage generally that the individual supply ducts 14 may be utilized separately from each other if desired. It is in this manner that it is possible, for instance, to utilize one and the same plate for the supply of vacuum, compressed air and electrical energy in the different ducts. The respective medium may then for instance pass through the respective medium tapping openings 34 and through a pressure line or the like, or by projecting cables or pressure line or the like, to the desired point on the surface of the plate.

For each supply duct 14 it is possible to have at least one connection opening. Furthermore it is possible to associate a series or row of connection openings consisting of openings spaced out along the length direction of the duct, with one or more of the supply ducts 14, as shown in FIG. 1. The connection openings 34 may be temporarily shut off in a manner dependent on the nature of the medium concerned, by means of plugs or of valves 37, or they may be left permanently open. The use of a valve is more particularly appropriate in the case of a fluid medium to make possible the connection of a pressure medium hose or a pressure fluid line 38, whose other end is connected with a component 30. Furthermore it is possible to have a conventional connecting member, which may if necessary be provided with check valves.

In the case of the connection openings 34 it may be a question of prefabricated openings or of openings which are produced by the user in a proper manner latter, as for instance by using a piercing tool.

A connection opening 34 associated with a supply duct 14 opens at one end into the supply duct 14 and at the other end at the surface of the plate nearest to the supply duct 14 in the part between two adjacent mounting recesses 2. This is made clear in FIGS. 1 and 3. On the other hand it is possible to place the connection openings, which run into one supply duct 14, in such a manner that at the other end they run into a mounting recess 2. This latter case is illustrated in FIG. 2 at 39 by way of example. In this respect it is convenient if via the connection opening there is a communication between a respective supply duct 14 and the mounting recess associated with it to constitute a pair made up of a duct and a recess 16. This design offers the advantage that each mounting recess has available its own independent supply duct for the supply of medium or the removal thereof.

Furthermore in at least one mounting recess 2 there are facilities for the supply of more particularly electrical or optical energy (as for example in the form of signals) such supply being more particularly by the intermediary of an anchoring part 24 or a filler part 24". The filler part 24" is suitably adapted in FIG. 1 for explanation. It consists of insulating material such as plastic and in the interior has at least one and more particularly two current conductors 40 extending in the longitudinal direction. They extend at one end side 7 from the filler part 24" and run to an energy supply device 44. If desired it is possible to have intermediate plug connecting devices. In the interior of the filler part 24' it is possible to have branching points so that the conductors 40 open at the limit surface 33. It is in this manner that connection points 45 are provided from which energy may be tapped using suitable plug connecting devices.

In lieu of electrical conductors it is possible to preferably use optical guides such as a glass fiber device. For instance it is then more particularly possible for pulses to be transmitted without any difficulty.

Figure 3:
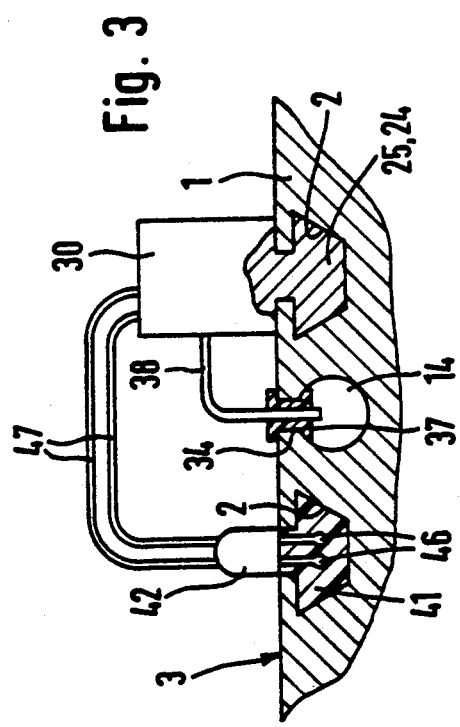

FIG. 3 shows a further possible working embodiment, in which again an energy conducting element 41 is accommodated in a mounting recess 2. It has insulated current conductors 46, which are more particularly set in grooves, in the form of conductor rails, which are accessible from the surface 3 of the plate. It is in this manner that it is possible to connect a plug device 42 which is more particularly like a slide, via which the transmitted signals may be tapped reliably at any position into which it has been slid. The signals are then conducted via lines 47 to a component 30 secured to the mounting plate 2.

The possibilities of universal application of the mounting plate in accordance with the invention will be clear. Using the mounting recesses any desired components, as for instance workpieces, groups of valves, piston and cylinder units and the like, may be secured in place and via the supply ducts 14 it is possible to supply and remove the medium necessary for the operation of the components or the like. Furthermore, however the mounting recesses may be used for conducting a signal by having a signal conductor. In this case an insulating section for instance will be anchored in a mounting recess, which for instance contains a conductor or wires consisting of copper or houses optical guides such as glass fiber guides.

It is an advantage if a plurality of mounting plate are able to be coupled together more particularly at their lateral sides 48 in order to provide plate surfaces of any desired area. For this purpose the mounting plates preferably have coupling devices 49, which make possible detachable connection together or plugging together of the plates. These longitudinal sides are preferably free of mounting recesses.

I claim:

1. A mounting plate for components such as valves or other devices and instrumentalities, having first spaced adjacent slot-like mounting recesses formed in a first surface of the plate which are parallel to each other and adapted to serve for attachment, and furthermore a plurality of supply ducts for a medium such as a fluid or energy, said ducts extending parallel to the mounting recesses, wherein in a second plate surface opposite to the first plate surface further mounting recesses are present, which are also arranged parallel to and spaced from each other in a second series with the same direction as the first series mounting recesses and extending parallel thereto, in such a manner that as seen in plan and looking towards the two surfaces—with the exception of the ends of the series—one respective mounting recess in one series is arranged between two mounting recesses of the other series and in the part between two adjacent mounting recesses of a given series a supply duct is provided, which is opposite to a mounting recess of the other series transversely in relation to the direction of the series 2. The mounting plate as claimed in claim 1, wherein the height of the plate is defined by the distance between the two said plate surfaces, a plurality of pairs, each consisting of two supply ducts superposed in the vertical direction and of mounting recesses, is arranged in sequence in the breadth direction coinciding with the row of series direction, and the ducts and recess of respectively directly following pairs are associated with opposite surfaces of the plate.

3. The mounting plate as claimed in claim 1, wherein the mounting recesses of the respective surface of the plate extend essentially in the same plane as the associated intermediately positioned supply duct.

4. The mounting plate as claimed in claim 1, wherein in the part between the supply ducts and/or the mounting recesses of respectively following pairs of ducts and recesses at least one cavity is provided which is more particularly duct-like in form, and the duct-like cavities present are preferably arranged in one plane, which extends between the two planes containing the series of recesses and parallel to the same.

5. The mounting plate as claimed in claim 4, wherein the form of the wall of the cavities in the part adjacent to one supply duct and/or one mounting recess is shaped to be essentially similar to the form of the associated duct wall or recess wall part.

6. The mounting plate as claimed in claim 1, wherein the mounting recesses and the supply ducts and furthermore any duct-like cavities present extend linearly in the longitudinal direction of the plate and are preferably continuous in such a manner that they end at opposite ends of the plate.

7. The mounting plate as claimed in claim 1, wherein the mounting recesses open towards the respective surface of the plate having a locking part somewhat deeper down in the interior of the plate, which is adjoined by a recess neck extending from it towards the surface of the plate and having a somewhat smaller breadth in such a manner that an anchoring part inserted into the mounting recesses interlocks with the part between the neck and the locking part and is prevented from being retracted from the plate.

8. The mounting plate as claimed in claim 7, wherein the locking part of the mounting recesses is rectangular or more particularly trapezoidal as seen in cross section and in the case of a trapezoidal form the larger parallel side thereof is adjacent to the neck.

9. The mounting plate as claimed in claim 1, wherein the supply ducts have a rounded form as seen in cross section and more particularly have circular cross section.

10. The mounting plate as claimed in claim 1, wherein at least one of the supply ducts is able to communicate with at least one medium connection opening provided or to be provided in the mounting plate, which preferably extends in the direction of the height of the plate and is preferably able to be shut temporarily, such opening being at the surface of the plate which is nearest the supply duct in the part between two consecutive mounting recesses and/or on the opposite side of the plate to open into the associated mounting recess and is able to be tapped via the respective supply duct for the passage therethrough of medium and at least one supply duct may be provided with a row of spaced connection openings or holes extending in the longitudinal direction of the plate.

11. The mounting plate as claimed in claim 1, comprising an anchoring member adapted to be inserted into at least one mounting recess temporarily, such member more particularly having a locking head complementary to the mounting recess, and preferably coming to an end flush with the associated surface of the plate and may have mounting means for components, member or instrumentalities, which for instance are in the form of magnetic strips, burr fasteners, adhesive strips or sections thereof.

12. The mounting plate as claimed in claim 11, wherein one anchoring member consitutes a filling part for bridging over the slot constituted by the associated mounting recess in the surface of the plate.

13. The mounting plate as claimed in claim 1, wherein at least one mounting recess is adapted for the supply of energy more particularly by the intermediary of an anchoring or filling member, such energy being more particularly in the form of electrical or optical energy, being supplied for instance by having on or in an energy supply element, which for instance consists of synthetic resin and more particularly having the form of an anchoring or filler member, at least one conductor more particularly in the form of glass fiber light guide and/or an electrical conductor in the form of a current rail, and means are provided for the removal of the energy more particularly to a component or the like mounted on the surface of the plate.

14. The mounting plate as claimed in claim 11, wherein an anchoring member is able to be slid in the longitudinal direction of the mounting recesses and is also able to be to be locked in place temporarily.

* * * * *

UNITED STATES PATENT AND TRADEMARK OFFICE
CERTIFICATE OF CORRECTION

PATENT NO. : 5 107 897
DATED : April 28, 1992
INVENTOR(S) : Kurt STOLL

It is certified that error appears in the above-identified patent and that said Letters Patent is hereby corrected as shown below:

Col. 8, line 45; change "of series" to ---or series---.

Signed and Sealed this

Thirtieth Day of November, 1993

Attest:

BRUCE LEHMAN

Attesting Officer

Commissioner of Patents and Trademarks